Patented July 31, 1928.

1,678,775

UNITED STATES PATENT OFFICE.

JAMES H. GRAVELL, OF ELKINS PARK, PENNSYLVANIA.

STORAGE AND TRANSPORTATION OF ACID MIXTURES IN STEEL DRUMS.

No Drawing.      Application filed December 11, 1925. Serial No. 74,898.

This invention relates to the storage and transportation of acid solutions such as attack steel in steel or iron containers or drums instead of glass or specially lined containers.

The principal objects of the present invention are, first, to provide for safely storing and transporting acids in steel drums or containers; second, to provide a method of treating a steel drum to fit it to safely carry acid solutions; third, to provide for preparing or treating an acid solution in such a way that it can be safely transported in a steel drum or container; and fourth, to provide an admixture which, added to an acid solution, will prevent the latter from attacking steel drums or containers.

Many acid solutions cannot be stored or shipped in ordinary wooden barrels, and glass carboys and rubber or other specially lined barrels have been used for that purpose; consequently the economical features and advantages of the use of steel drums are evident. It is therefore a further object of the invention to lessen the expense of the containers and to reduce the risk of breakage in handling when shipping acid solutions.

Although the invention applies to acid solutions generally, it is particularly useful in connection with solutions of sulphuric, hydrochloric and phosporic acids.

The invention is based on the discovery that acid solutions containing certain metals with or without so-called pickle control substances or acid regulators, when brought into contact with iron and steel, automatically form or deposit a protective coating on the inner surface of the container which acts to prevent the acid solution from attacking the container.

The metals which have that property are below iron and above mercury in the electromotive scale. Under certain conditions tin produces good commercial results. However, arsenic in most cases is more satisfactory.

Examples of pickle control substances or acid regulators are crude anthracene, sulphite lye residues from the production of naphthalene, acid resins, waste acids from refining hydrocarbons, residues from the distillation of organic compounds, nitrogen ring compounds, cyanides, liquid obtained from boiling bran and other starchy materials in water, sodium bisulphate, hydrocarbon tars, alcohols such as methyl, ethyl, propyl, amyl, butyl, etc., higher alcohols including gylcerine, cellulose pulp waste, sumac leaves, gelatine, remains from the distillation of anthracene, distillates from gelatine by itself or with fats, organic bases, and aldehydes.

The distillate from gelatine and fat consisting of various materials including organic bases such as pyridine bases and the like, produces excellent results and therefore will be selected in this description as a typical acid regulator or pickle control although other controls or regulators may be substituted.

Evidently acid liquids or solutions which have heretofore been transported in glass or rubber lined containers may be primarily compounded to incorporate the present invention, or an admixture of my invention may be added to the acid liquid or solution either just before or just after the latter is placed in steel drums.

The material used in the pickling industry for regulating the effect of acid and designated a pickle control or acid regulator consists substantially of Organic bases _____ .25 gals.
Hydrochloric acid _____ .75 gals.

and it must be shipped in glass. However, if arsenic trioxide is added to the material substantially as follows

| | |
|---|---|
| Organic bases | .25 gals. |
| Hydrochloric acid | .75 gals. |
| Arsenic trioxide (As$_2$O$_3$) | .125 bbls. | the material may be shipped and stored in steel drums due to the protective coating formed, precipitated or deposited on the inner surface of the drum. Although arsenic plates out, the organic bases are not affected sufficiently to make any difference in the commercial use of the material.

Dilute phosphoric acid used, among other things, for preparing automobile bodies for painting must be shipped in glass or rubber lined containers. An example of such a material is

| | |
|---|---|
| 85% phosporic acid | .250 gals. |
| Water, etc | .750 gals. |

However, if organic bases and arsenic are added substantially as follows:

| | |
|---|---|
| 85% phosporic acid | .25 gals. |
| Water, etc | .75 gals. |
| Organic bases | .00062 gals. |
| Arsenic trioxide (As$_2$O$_3$) | .01 pounds. | the resultant liquid may be safely shipped in steel drums and the addition of organic bases and arsenic does not interfere with the operation of the material in its intended use.

The proportion of arsenic and organic bases may be widely varied in the admixture, and the amount of the admixture added to the solution may be extensively varied depending upon individual taste and commercial requirements.

An admixture of an acid regulator or pickle control and a metal located in the eelctromotive series below iron and above mercury (preferably tin or arsenic) may be added to acid solutions such, for example, as have been referred to without detriment to the acid solution for the purpose for which it is intended and enables the acid solution to be shipped in steel drums or stored in steel tanks.

An admixture suitable for this purpose is substantially

| | |
|---|---|
| Organic bases | .190 pounds |
| Arsenic trioxide (As$_2$O$_3$) | .143 pounds |

This admixture is a rather stiff paste and should be used in sufficient quantity to produce the desired result, for instance, the amount required to prevent objectionable action of a dilute solution of sulphuric acid on a steel drum is

| | |
|---|---|
| Sulphuric acid | 1.000 gals. |
| Water | 10.000 gals. |
| Admixture | .010 lbs. |

If desired the admixture of organic bases and arsenic may be made in liquid form by the adidtion of sulphuric acid and water to the paste substantially as follows:

| | |
|---|---|
| Organic bases | .190 pounds |
| Arsenic trioxide (As$_2$O$_3$) | .143 pounds |
| Sulphuric acid (66°) | .153 gals. |
| Water | .833 gals. |

In making the admixture it is well to convert the arsenic into sodium arsenite before adding it to the admixture in order to facilitate solution. The admixture itself may be shipped safely in steel drums and it constitutes a satisfactory acid regulator or pickle control because much of the arsenic is precipitated on the inner surface of the steel drum, leaving too small an amount behind to interfere with the commercial use of the acid regulator or pickle control. Or the admixture may be added to solutions of sulphuric or hydrochloric acid in sufficient amounts to prevent the solutions from attacking steel drums.

It may be remarked that when metals and pickle controls or acid regulators of which organic bases are an example are dissolved in acid solutions, salts of these materials are, at least in most cases, formed.

Various modifications of the invention may be practiced without departing from the spirit of the invention, for instance, a steel drum may first be coated internally with arsenic and then filled with an acid regulator or pickle control solution, or acid solutions containing an acid regulator or pickle control need only the addition of the proper metal, for example, an acid solution containing gelatine needs only the addition of tin.

I claim:

1. The method of preventing an acid solution from attacking a steel transportation or storage drum containing it which consists in dissolving in the said acid solution a material capable of precipitating a substantial protective coating on steel, and allowing the admixture to contact with the inner steel surface of the drum.

2. The method of preventing an acid solution from attacking a steel transportation or storage drum containing it which consists in admixing with the said acid solution a compound of a metal below iron and above mercury in the electromotive series and an acid regulator, and allowing the admixture to contact with the steel drum.

3. The method of preventing an acid solution from attacking a steel transportation or storage drum containing it which consists in admixing with the said acid solution arsenic compound and an acid regulator, and allowing the admixture to contact with the steel drum.

4. The method of preventing an acid solution from attacking a steel transportation or storage drum containing it which consists in admixing with the said acid solution arsenic compound and organic bases, and allowing the admixture to contact with the steel drum.

5. A composition of matter for preventing the action of acid solutions on steel drums comprising an admixture of a metal below iron and above mercury in the electromotive series and an acid regulator.

6. A composition of matter for preventing the action of acid solutions on steel drums consisting of an admixture of arsenic compound and an acid regulator.

7. A composition of matter for preventing the action of acid solutions on steel drums consisting of an admixture of arsenic compound and organic bases.

8. The herein described composition of matter comprising an acid solution, organic bases, and an admixture of arsenic compound in quantity sufficient to plate out a protective coating on steel containers.

JAMES H. GRAVELL.